US012785960B2

(12) United States Patent
Krassovsky et al.

(10) Patent No.: US 12,785,960 B2
(45) Date of Patent: Nov. 3, 2026

(54) DEVICE VERIFICATION USING KEY TRANSPARENCY

(71) Applicant: WhatsApp LLC, Menlo Park, CA (US)

(72) Inventors: Viatcheslav Krassovsky, Berkeley, CA (US); Kevin Lewi, Mountain View, CA (US); Sean Francis Lawlor, Beaconsfield (CA); Ercan Ozturk, San Francisco, CA (US); Alexander Chernyak, Mountain View, CA (US); Dillon George, Oakland, CA (US)

(73) Assignee: WhatsApp LLC, Menlo Park, CA (US)

( * ) Notice: Subject to any disclaimer, the term of this patent is extended or adjusted under 35 U.S.C. 154(b) by 338 days.

(21) Appl. No.: 18/061,851

(22) Filed: Dec. 5, 2022

(65) Prior Publication Data

US 2024/0039720 A1 Feb. 1, 2024

Related U.S. Application Data

(60) Provisional application No. 63/393,132, filed on Jul. 28, 2022.

(51) Int. Cl.
*H04L 9/30* (2006.01)
*H04L 9/14* (2006.01)

(52) U.S. Cl.
CPC . *H04L 9/30* (2013.01); *H04L 9/14* (2013.01)

(58) Field of Classification Search
CPC .................................... H04L 9/30; H04L 9/14
See application file for complete search history.

(56) References Cited

U.S. PATENT DOCUMENTS 9,996,684 B2 * 6/2018 Hoyos ..................... G06F 21/34
2002/0120871 A1 * 8/2002 Watkins ................. G06F 21/79
726/23

(Continued)

FOREIGN PATENT DOCUMENTS

GB 2419791 A 5/2006
WO 2019013847 A1 1/2019

OTHER PUBLICATIONS

European Search Report for European Patent Application No. 23187449.6, dated Feb. 1, 2024, 9 pages.

(Continued)

*Primary Examiner* — Vance M Little
(74) *Attorney, Agent, or Firm* — EVERSHEDS SUTHERLAND (US) LLP

(57) ABSTRACT

A method for initiating a chat between participants in a group chat is provided. The method includes requesting, with a first client device from a first participant, to initiate a chat with a second client device from a second participant, receiving, from a chat server, an identification for the second participant, requesting, from a verifiable directory, an identity proof of the second participant associated with the identification for the second participant, wherein the verifiable directory includes a list of encryption keys for client devices associated with each of multiple users in the chat server, verifying the identity proof of the second participant, and initiating the chat with the second participant when the identity proof of the second participant is verified. A system including a memory storing instructions, and a processor to execute the instructions for the system to perform the above method are also provided.

13 Claims, 12 Drawing Sheets

(56) References Cited

U.S. PATENT DOCUMENTS

| | | | | |
|---|---|---|---|---|
| 2016/0042420 | A1* | 2/2016 | Purcell | G06Q 30/0613 705/26.41 |
| 2017/0006038 | A1* | 1/2017 | Zhang | H04L 63/08 |
| 2020/0092113 | A1* | 3/2020 | Hutchison | H04L 9/0894 |
| 2021/0160314 | A1* | 5/2021 | Parvataneni | H04L 9/3239 |
| 2022/0311614 | A1* | 9/2022 | Stolbikov | H04L 9/0825 |

OTHER PUBLICATIONS

Schillinger F., et al., "End-to-End Encryption Schemes for Online Social Networks," Advances in Databases and Information Systems, Jul. 11, 2019, pp. 133-146.

* cited by examiner

DEVICE VERIFICATION USING KEY TRANSPARENCY

CROSS-REFERENCE TO RELATED APPLICATIONS

The present application is related and claims priority under 35 U.S.C. § 119(e) to U.S. Prov. Pat. Appln. No. 63/393,132, entitled AUTOMATIC IDENTITY VERIFICATION USING KEY TRANSPARENCY, to Viatcheslav KRASSOVSKY et al., filed on Jul. 28, 2022, the contents of which are herein incorporated by reference in their entirety, for all purposes.

BACKGROUND

Field

The present disclosure is related to the field of secured communications between at least two participants in a group chat. More specifically, the present disclosure is directed to methods and systems that protect messaging between two or more participants in a group chat from an identity attack by a host server or other malicious players.

Related Art

Current messaging systems have used many different types of data encryption in peer-to-peer communications to ensure data security and privacy. Most state-of-the-art methods include the transfer of at least some identity information about participants in a chat event to the server hosting the event. Accordingly, when the server is compromised by a malicious third party, large numbers of users of the chat server (millions, or even billions of people) may become victims of identity theft, data loss, or publication of sensitive, personal information.

SUMMARY

In a first embodiment, a computer-implemented method includes requesting, with a first client device from a first participant, to initiate a chat with a second client device from a second participant, receiving, from a chat server, an identification for the second participant, requesting, from a verifiable directory, an identity proof of the second participant associated with the identification for the second participant, wherein the verifiable directory includes a list of encryption public-keys for client devices associated with each of multiple users in the chat server, verifying the identity proof of the second participant with a public key associated with the second client device, and initiating the chat with the second participant when the identity proof of the second participant is verified.

In a second embodiment, a system includes a memory storing multiple instructions and one or more processors configured to execute the instructions to cause the system to perform operations. The operations include to request, with a first client device from a first participant, to initiate a chat with a second client device from a second participant, to receive, from a chat server, an identification for the second participant, to request, from a verifiable directory, an identity proof of the second participant associated with the identification for the second participant, wherein the verifiable directory includes a list of encryption public-keys for client devices associated with each of multiple users in the chat server, to verify the identity proof of the second participant with a public key associated with the second client device, and to initiate the chat with the second participant when the identity proof of the second participant is verified.

In a third embodiment, a computer-implemented method includes requesting, from an identity provider, an identification value for a user of a chat group service, requesting, from a selected witness authority, a cross-validation of the identification value, generating an encrypted pair associated with the identification value upon receipt of the cross-validation of the identification value, the encrypted pair including a private key and a public key, storing the identification value and the public key in a database, and transmitting the private key to the user of the chat group service.

In other embodiments, a non-transitory, computer-readable medium stores instructions which, when executed by a processor, cause a computer to perform a method. The method includes requesting, with a first client device from a first participant, to initiate a chat with a second client device from a second participant, receiving, from a chat server, an identification for the second participant, requesting, from a verifiable directory, an identity proof of the second participant associated with the identification for the second participant, wherein the verifiable directory includes a list of encryption public-keys for client devices associated with each of multiple users in the chat server, verifying the identity proof of the second participant with a public key associated with the second client device, and initiating the chat with the second participant when the identity proof of the second participant is verified.

In yet other embodiments, a system includes a first means to store instructions, and a second means to execute the instructions to perform a method. The method includes requesting, with a first client device from a first participant, to initiate a chat with a second client device from a second participant, receiving, from a chat server, an identification for the second participant, requesting, from a verifiable directory, an identity proof of the second participant associated with the identification for the second participant, wherein the verifiable directory includes a list of encryption public-keys for client devices associated with each of multiple users in the chat server, verifying the identity proof of the second participant with a public key associated with the second client device, and initiating the chat with the second participant when the identity proof of the second participant is verified.

These and other embodiments will become clear to one of ordinary skill in view of the following disclosure.

BRIEF DESCRIPTION OF THE DRAWINGS

In the figures, elements having the same or similar reference numerals are related to the same or similar attributes or features, unless explicitly stated otherwise.

DETAILED DESCRIPTION

Figure 1:
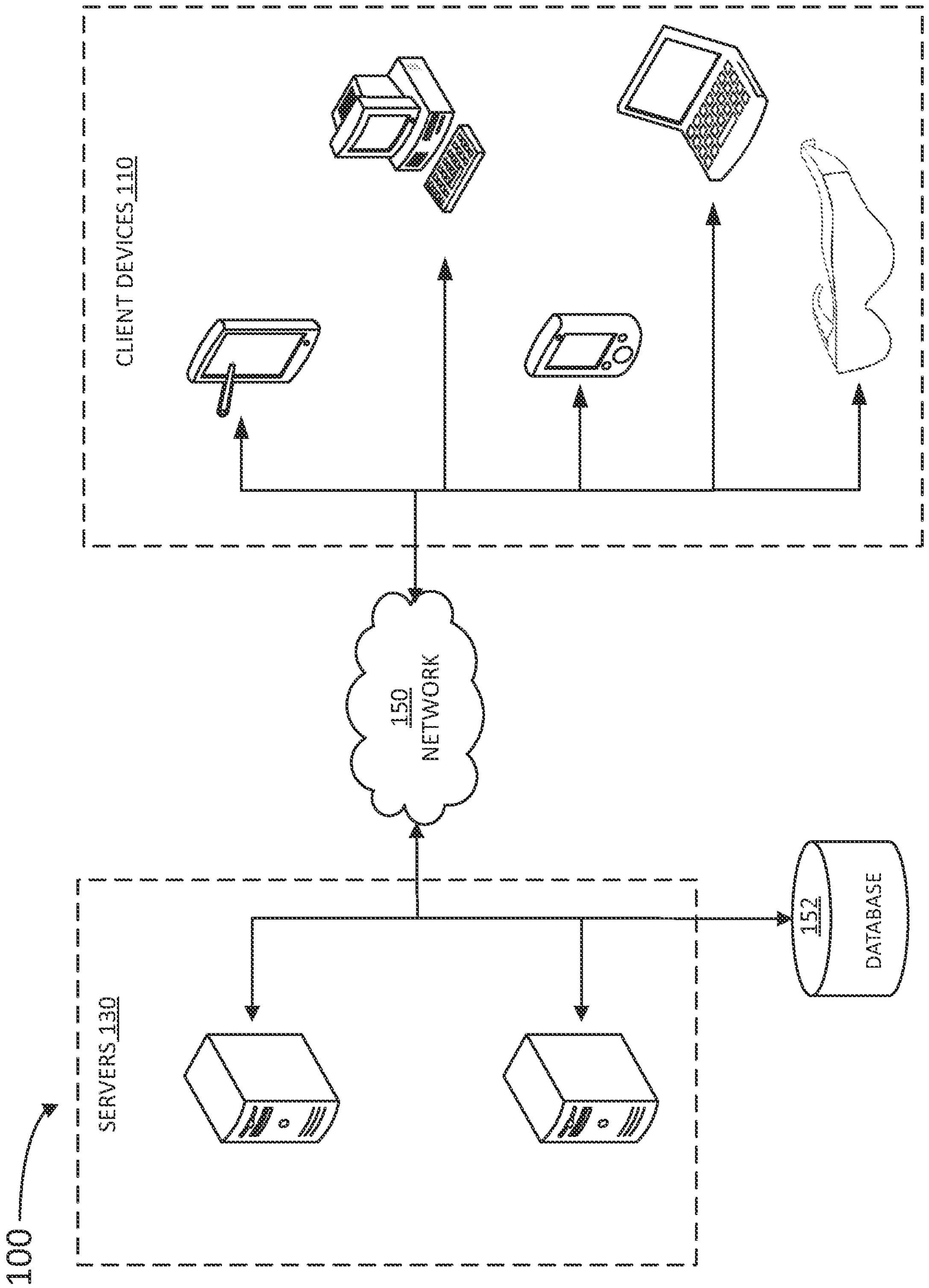
FIG. 1 illustrates a network architecture for a group chat service providing device verification using key transparency, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

The use of end-to-end encrypted messaging ensures that conversations between users remain private. However, it is desirable to ensure that these interactions occur with people whose identities are certified. To avoid being compromised by a malicious attack (e.g., by an impersonator, or to be robbed of one's own identity for spurious activity), users typically discover the necessary public keys to identify each other. In some configurations, identity verification is accomplished by scanning a quick-response (QR) code in person to validate recipient public keys or by depending on a service provider to generate the relevant public key associated with a communication partner. In some approaches, a service provider stores the public keys of individuals on a publicly accessible key directory server so that users can query this server for messaging individuals in their contact list. However, since the server can supply users with outdated or fabricated keys, this strategy is vulnerable to attacks on the server itself (e.g., the server becoming a malicious actor).

To resolve the above problems arising in the technical field of identity verification for group chats and calls, embodiments as disclosed herein include an efficient, verifiable directory including a cryptographic primitive which allows an identity provider to store an evolving set of label-value pairs, commit to this set, as well as respond (with crypto-graphic proofs) to queries about this committed set and its updates. Accordingly, embodiments as disclosed herein include a large-scale cryptographic construction that can support billions of users on reasonably-sized servers. To make the system efficient, some embodiments include a modified crypto-graphic building-block as an ordered zero-knowledge set, which augments the primitives to satisfy the functionality and security requirements, without degrading privacy. The zero-knowledge set includes functions that verify the identity of call participants without revealing private information critical to the participant, when the request for verification involves a third-party or non-registered user. This preserves the functionality of the architecture without compromising privacy, and increasing the efficiency (as less cryptographic transactions are used).

In addition to zero-knowledge functions, some embodiments include a compaction operation that reduces the data stored on the secured database. Accordingly, the compaction operation purges ancient and obsolete entries. In some embodiments, a secure compaction operation may loosen the constraints for using "append-only" data-structures, which provide quick storage and retrieval data access. In some embodiments, verifiable directories with compaction as disclosed herein may include subroutines having a tunable leakage parameter, which can be updated in accuracy and precision. In some embodiments, compaction operations may be used only for long term data storage and usage. In addition to constructing memory optimizations for verifiable directories, some embodiments include a modular and flexible data-layer application programming interface (API), which can implemented using a distributed database solution (or even a local, in-memory storage solution).

Some embodiments include an identity provider that keeps a local database linking each of a user identifier (e.g., phone numbers, names, aliases, name tags, and other identification values) to an associated public key. The identity provider periodically sends a commitment of its latest state to a distributed set of authorities (e.g., witnesses) that ensure its correct behavior. The witnesses store the latest commitment and also communicate with users to make sure the identity provider is not censoring or eclipsing them. The users may query the identity provider to look up the public key associated with a specific user identifier. Each user can additionally monitor the history of their own public key, to identify a malicious activity or error. The identity provider ensures that only permissioned users can perform particular actions.

Example System Architecture

FIG. 1 illustrates a network architecture 100 configured for device verification in group chat applications, according to some embodiments. Servers 130 and a database 152 are communicatively coupled with client devices 110 via a network 150. Servers 130 may host a group chat application running in client devices 110. Client devices 110 may be used by participants in the group chats (e.g., chats involving two or more participants). Client devices 110 may include smart phones, laptops, mobile devices, palm devices, and even desktops. In some embodiments, client devices 110 may include virtual reality or augmented reality (VR/AR) headsets and/or smart glasses, and the group chat conversation may include immersive reality elements. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. Database 152 may store user identification protected by encrypted keys that may be distributed to each and all of the group chat participants.

Figure 2:
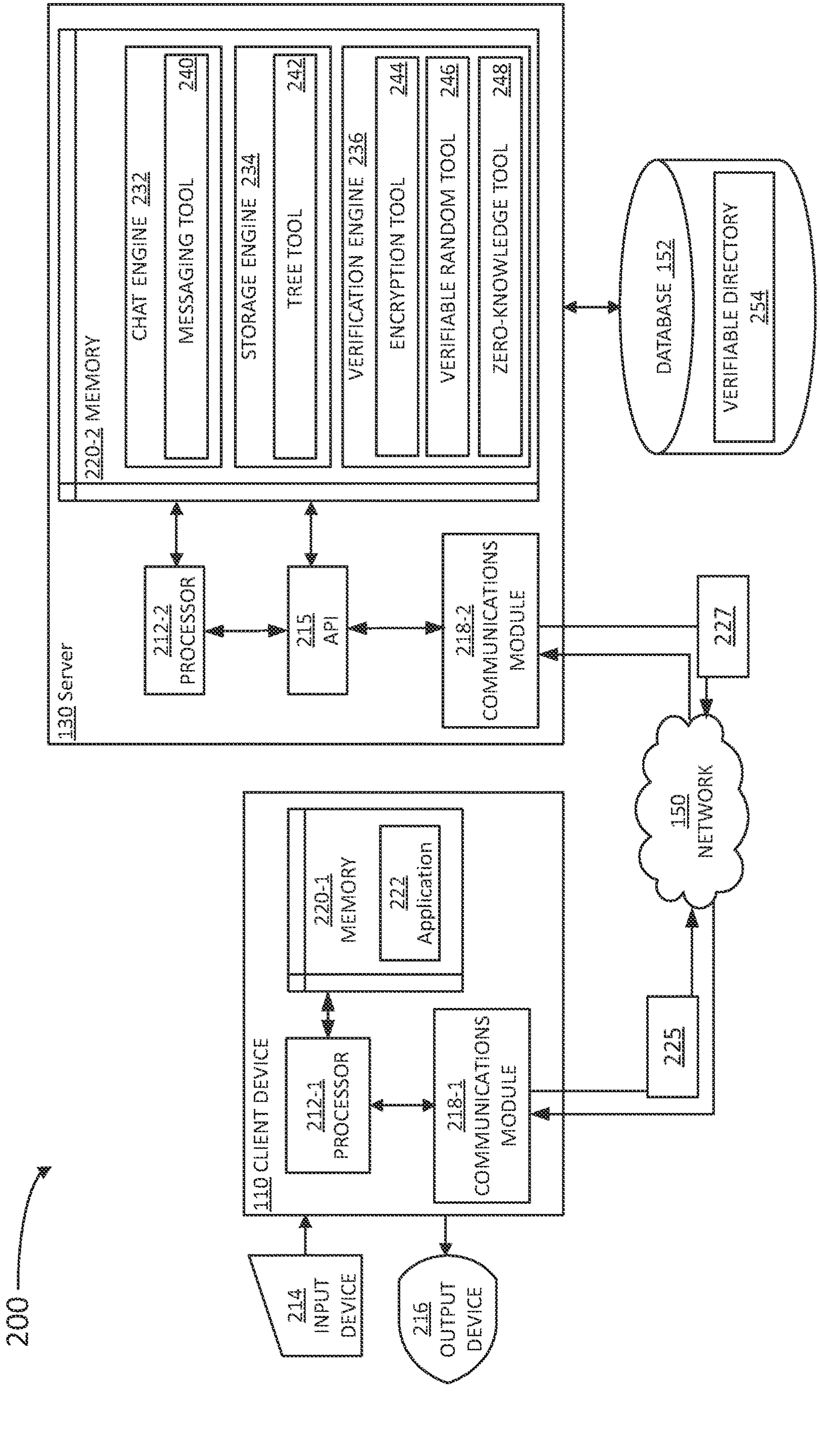
FIG. 2 is a block diagram illustrating an example server, client device, and a database from the architecture in FIG. 1, according to some embodiments.

FIG. 2 is a block diagram 200 illustrating an example server 130, client device 110, and database 152 from architecture 100, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency -RF-, near field communications -NFC-, Wi-Fi, and Bluetooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units -IMUs- and other sensors configured to provide input data to a VR/AR headset. Output device 216 may be a screen display, a touchscreen, a speaker, and the like.

Client device 110 may include a memory 220-1 and a processor 212-1. Memory 220-1 may include a group chat application 222, configured to run in client device 110 and couple with input device 214 and output device 216. Application 222 may be downloaded by the user from server 130 and may be hosted by server 130. Execution of application 222 may be controlled by processor 212-1. In some embodiments, client device 110 is a VR/AR headset and application 222 is an immersive reality application (e.g., an immersive group chat application). In some embodiments, client device 110 is a mobile phone that can collect a video or image of a participant in a group chat hosted by application 222.

Server 130 includes a memory 220-2, a processor 212-2, a communications module 218-2, and an API 215. Hereinafter, processors 212-1 and 212-2, and memories 220-1 and 220-2, will be collectively referred to, respectively, as "processors 212" and "memories 220." Processors 212 are configured to execute instructions stored in memories 220.

In some embodiments, memory 220-2 includes a chat engine 232, a storage engine 234, and a verification engine 236. A participant in a group chat may access chat engine 232 using client device 110, through application 222. Chat engine 232 may share or provide features and resources to application 222, such as a messaging tool 240, through API 215. Messaging tool 240 is configured to collect and synchronize voice, text, and media feeds (e.g., video, images, screenshares, and the like) from each participant in a group chat and provide a chat feed to all participants.

Storage engine 234 includes a tree tool 242 that provides a data storage architecture in a publicly verifiable configuration. Tree tool 242 may also provide identity proofs to client devices 110 used by participants in group chats. In some embodiments, identity proofs are not encrypted, and may be readable/verifiable by anyone in the public. Identity proofs provide cryptographic proof of data stored in database 152, such as a public key associated with client device 110, which is necessary to sending messages to its user. While the identity proof is publicly visible, it cannot be modified by anyone in the public, and unauthorized edits to identity proofs cause identity validation to fail.

Verification engine 236 may include an encryption tool 244, a verifiable random tool 246, and a zero-knowledge tool 248. Encryption tool 244 provides encrypted pairs including a public key and a private key for each identification value of registered users of chat application 222. An identification value for a user may include an identification number for client device 110, an identification number or a name tag associated with the user of client device 110, or any combination thereof. The public key may be stored with the identification value according to a verifiable architecture (e.g., a Merkle tree) provided by tree tool 242. The verifiable architecture may include further encryption steps executed by encryption tool 244. Verifiable random tool 246 may generate a deterministic function executable by a holder of a private key having as input the associated public key, and produces an identification proof as an output. Zero-knowledge tool 248 includes a function that verifies an identification value for a third-party accessing verification engine 236 without revealing a privacy sensitive information about a user of chat engine 232.

Accordingly, client device 110 may provide a data set 225 to server 130, and server 130 may provide a data set 227 to client device 110. Data set 225 may include an information value for client device 110 (or the user/owner thereof), or an updated information value, or a request for an information proof. Likewise, data set 227 may include an information proof, an encrypted pair of public and private keys, or either of these, or a script for a verifiable random function or a leakage function for a zero-knowledge identity authentication.

Database 152 may include a verifiable directory 254 storing identifications of users registered with chat engine 232, each identification protected by an encrypted pair of keys also stored in verifiable directory 254. Verifiable directory 254 may be created by storage engine 234 using tree tool 242 to store identification values and encrypted keys in a Merkle tree. Identification updates in verifiable directory 254 are instantiated by verifiable random tool 246 and zero-knowledge tool 248. In some embodiments, an identification update may include a change of a name tag for a user of chat engine 232, or the same user with the same identification value may want to register a new client device 110. The new client device 110 may replace an old client device 110, or may be added by the user to the same username for alternative use of group chat application 222. Accordingly, the dimension and complexity of verifiable directory 254 grows linearly with the number of updates for labels in the directory.

In some embodiments, chat engine 232, storage engine 234, verification engine 236, the tools contained therein, and at least part of database 152 may be hosted in a different server that is accessible by server 130 or client device 110.

Figure 3:
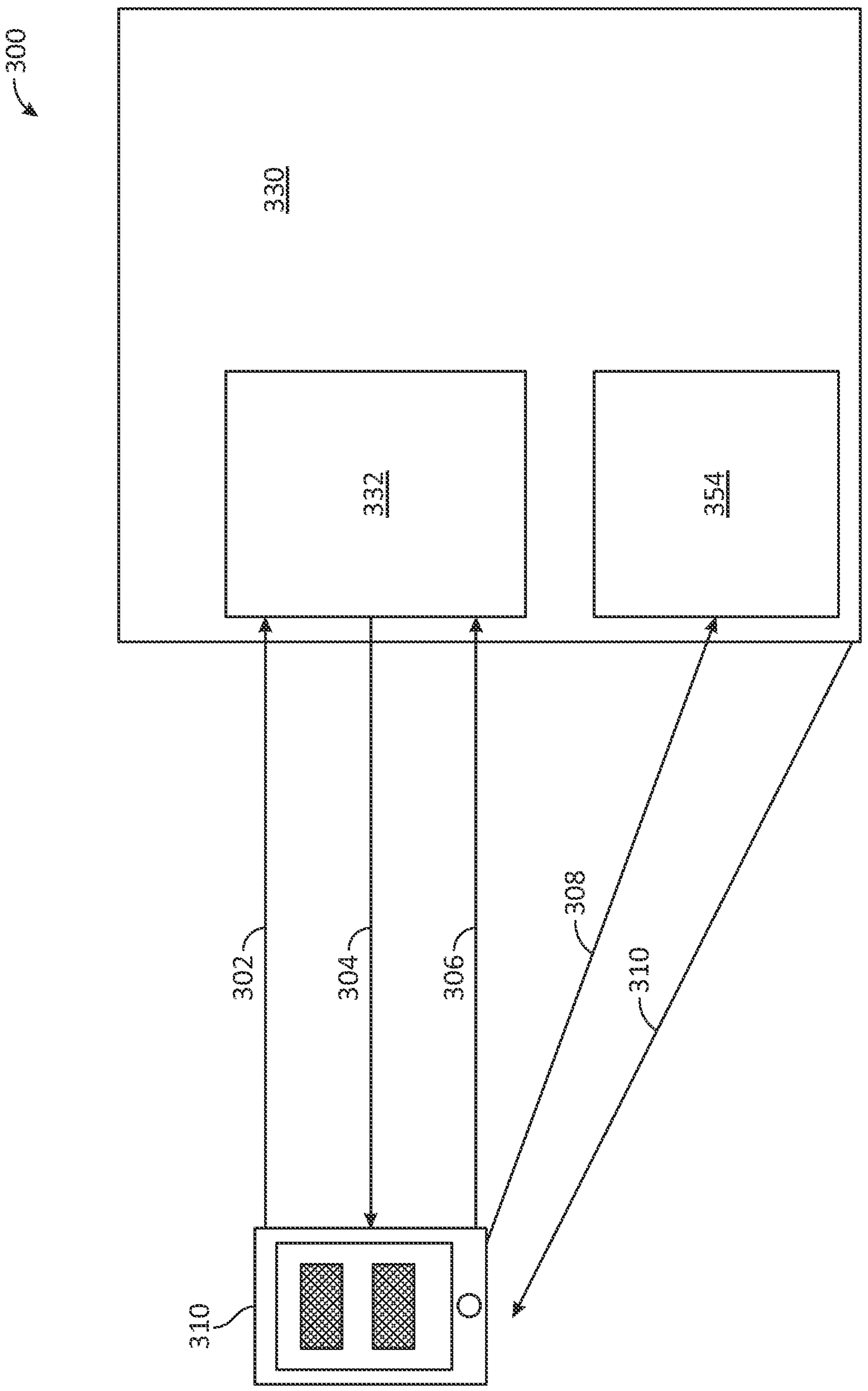
FIG. 3 is a block diagram illustrating a first participant initiating a call with a second participant and requesting an identity proof of the second participant from a verifiable directory, according to some embodiments.

FIG. 3 is a block diagram 300 illustrating a first participant ("Alice") using client device 310, initiating a call via a chat engine 332 in a server 330 with a second participant ("Bob," not shown) and requesting an identity proof of Bob from a verifiable directory 354, according to some embodiments.

In step 302, Alice requests chat engine 332 to initiate the chat with Bob. In step 304, chat engine 332 transmits Bob's identity values to Alice. In step 308, Alice requests verifiable directory 354 an identity proof for Bob. In step 310, Alice receives the identity proof for Bob from verifiable directory 354. When Alice verifies the identity proof, she starts the chat with Bob in step 306.

While chat engine 332 and verifiable directory 354 are shown as being within the same server 330, this is not necessarily the case, as embodiments consistent with the present disclosure may include each of chat engine 332 and verifiable directory 354 being in separate servers.

Figure 4:
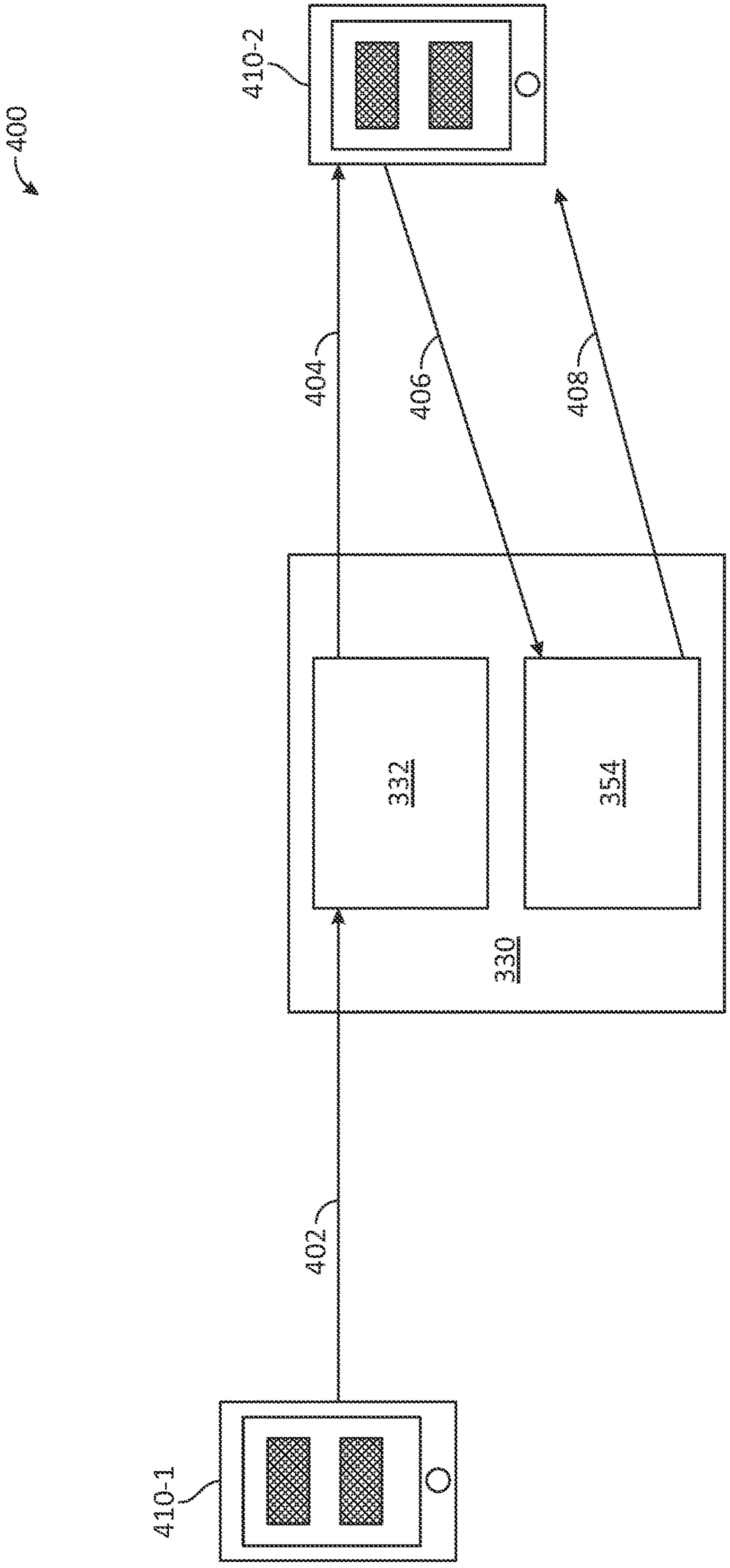
FIG. 4 is a block diagram illustrating a change of identity from a first participant in a call, and a request from a second participant to a verifiable directory to verify the change of identity, according to some embodiments.

FIG. 4 is a block diagram 400 illustrating a change of identity from a first participant (e.g., Alice) in a call using a client device 410-1, and a request from a second participant (e.g., Bob) to verifiable directory 354 in server 330, to verify the change of identity, according to some embodiments. The call is handled by chat engine 332 in server 330. Bob may use a separate client device 410-2 to participate in the call. Hereinafter, client devices 410-1 and 410-2 will be collectively referred to as "client devices 410."

In step 402, Alice submits a change of identity value to chat engine 332. The change of identity value may include a change of name, a change of alias, or any other identification number or text, or even a change of client device (e.g., 410-1 replacing client device 310, or retiring client device 310, which may be lost or stolen, or simply adding a new client device 410-1 to make calls, e.g., a new laptop, a new desktop, palm device, and the like). In step 404, Bob receives from chat engine 332 a notification about the change of identity submitted by Alice. In step 406, Bob requests verifiable directory 354 to verify Alice's change of identity. In response, verifiable directory 354 sends Bob an identity proof for Alice that includes Alice's new identity in step 408. Bob may authenticate the validity of the identity proof using a verifiable random function and a private key provided to Bob by server 330 (cf. encryption tool 244 and verifiable random tool 246).

Figure 5:
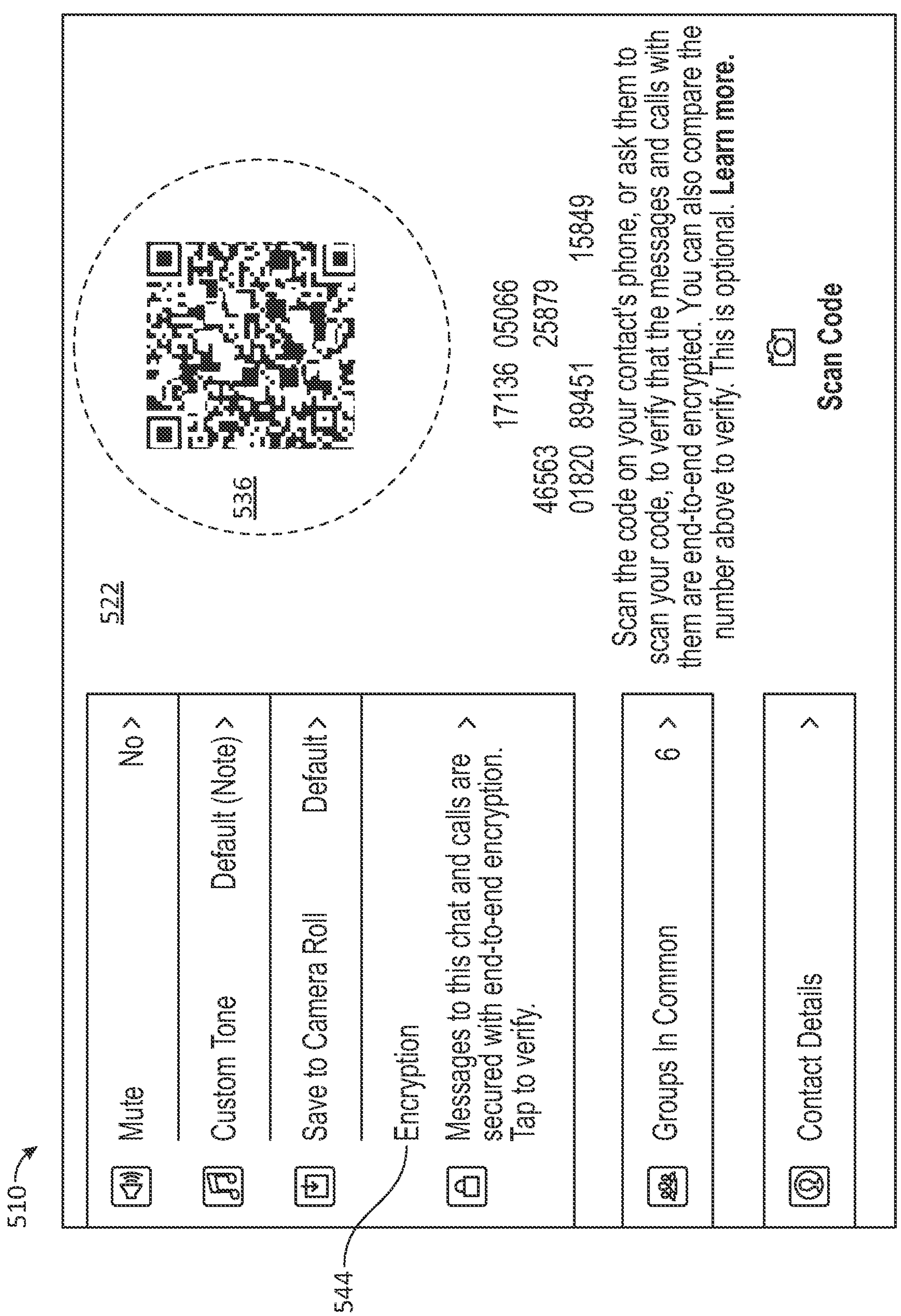
FIG. 5 illustrates a graphic code provided to a call participant for verifying an identity of a second participant in the call, according to some embodiments.

FIG. 5 illustrates a graphic code 536 provided to a call participant (e.g., Alice) on a chat application 522 in a mobile device 510, for verifying an identity of a second participant (e.g., Bob) in the call, according to some embodiments. Alice may be running chat application 522 in a client device (e.g., a mobile phone). Chat application 522 may include an encryption widget 544 handled by an encryption tool in the server hosting application 522 (cf. encryption tool 244). Alice may then scan graphic code 536 and authenticate Bob's identity to continue with or initiate the call.

Figure 6:
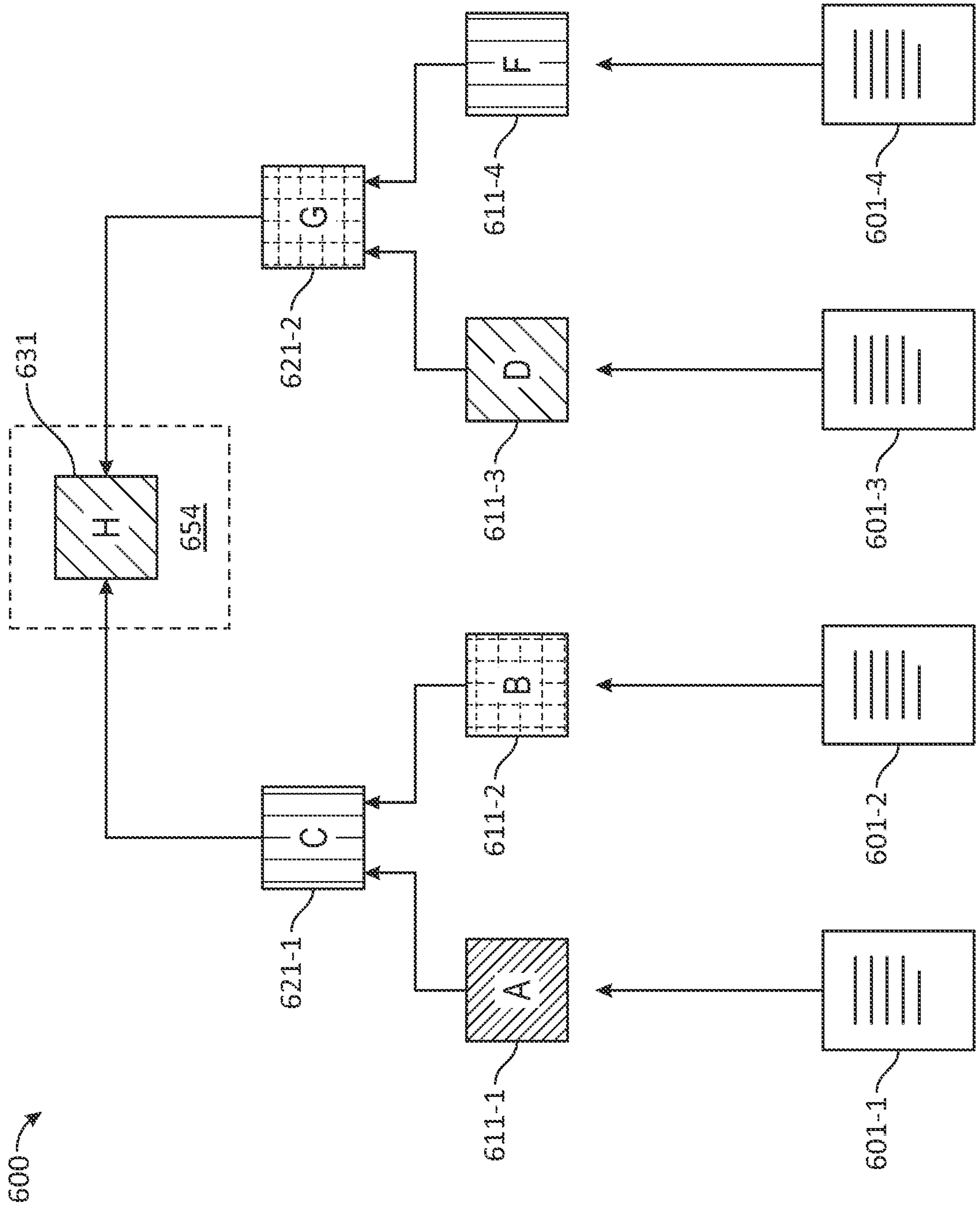
FIG. 6 is a tree diagram illustrating the architecture of a verifiable directory storing identities of users of a chat group application, according to some embodiments.

FIG. 6 is a tree diagram 600 illustrating the architecture of a verifiable directory 654 storing identities values 601-1, 601-2, 601-3, and 601-4 (hereinafter, collectively referred to as "identity values 601") for each of the users of a group chat application, according to some embodiments. Identity values 601 may be identity values by the users themselves or an identity provider (e.g., a government institution or some other authority). Diagram 600 may be a Merkle tree, configured in such a way that all the information may be compacted into a single hash 631 after one or two layers of hashing. A first layer includes hashes 611-1, 611-2, 611-3, and 611-4 (hereinafter, collectively referred to as "first layer hashes 611"), resulting from hashing identity values 601 with the public keys for each of the users. A second layer of hashes 621-1 and 621-2 (hereinafter, collectively referred to as "second layer hashes 621") may include a pairwise hashing of first layer hashes 611 according to rules defined by a variable random function (cf. verifiable random tool 246). Finally, a third layer of hashing 631 is achieved again by pairwise hashing second layer hashes 621 based on rules established by the variable random function. Notice how the complexity and size of the data structure is reduced by a factor of 2 for higher layers.

While diagram 600 is an illustrative example, it is understood that the hashing for every layer may be performed by triples, quadruples, and k-tuples in general, in which case the reduction in size takes place at a geometric pace by exponents of k, while the computation length increases logarithmically at base-k.

Figure 7A:
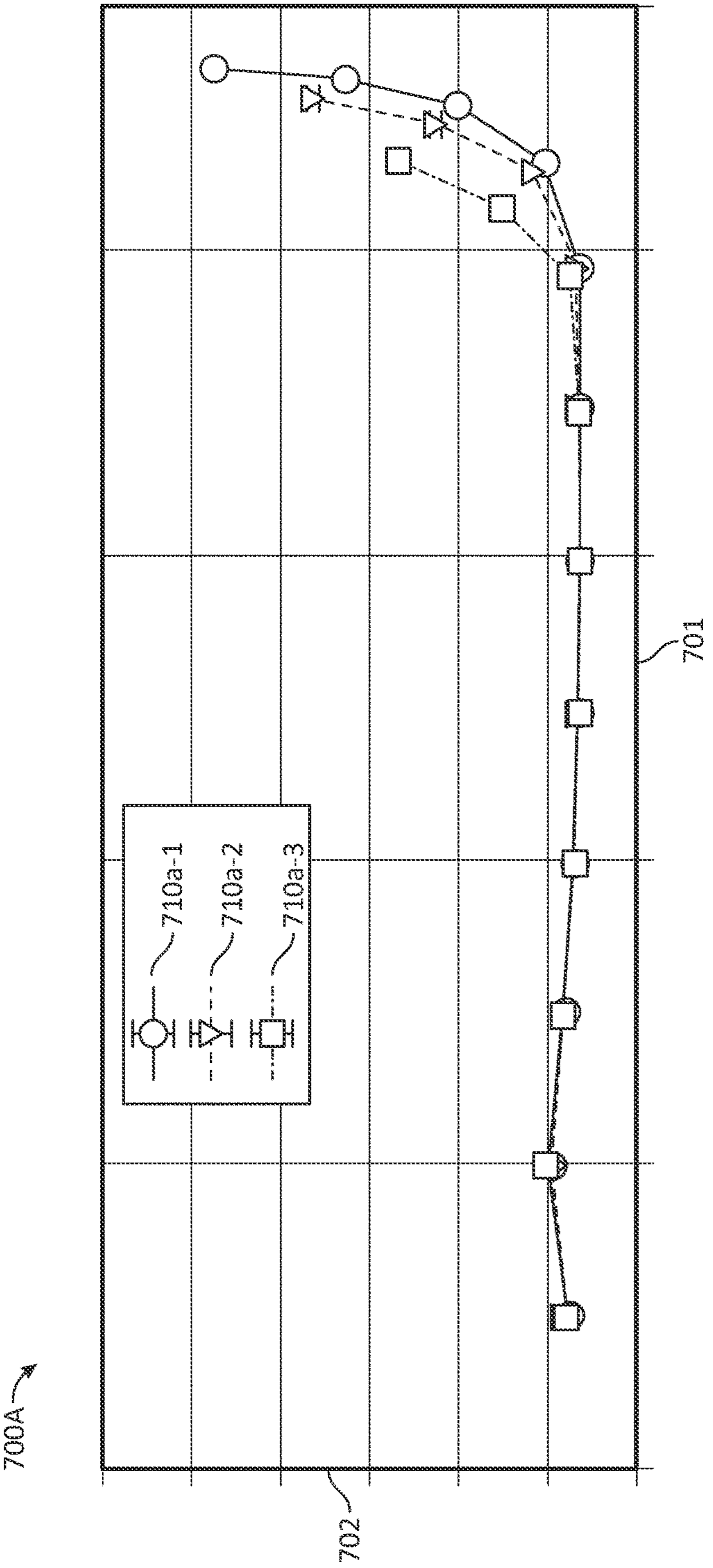
FIGS. 7A-7C illustrate throughput-latency charts for different verifiable directory architectures in a group chat application, according to some embodiments.
Figure 7B:
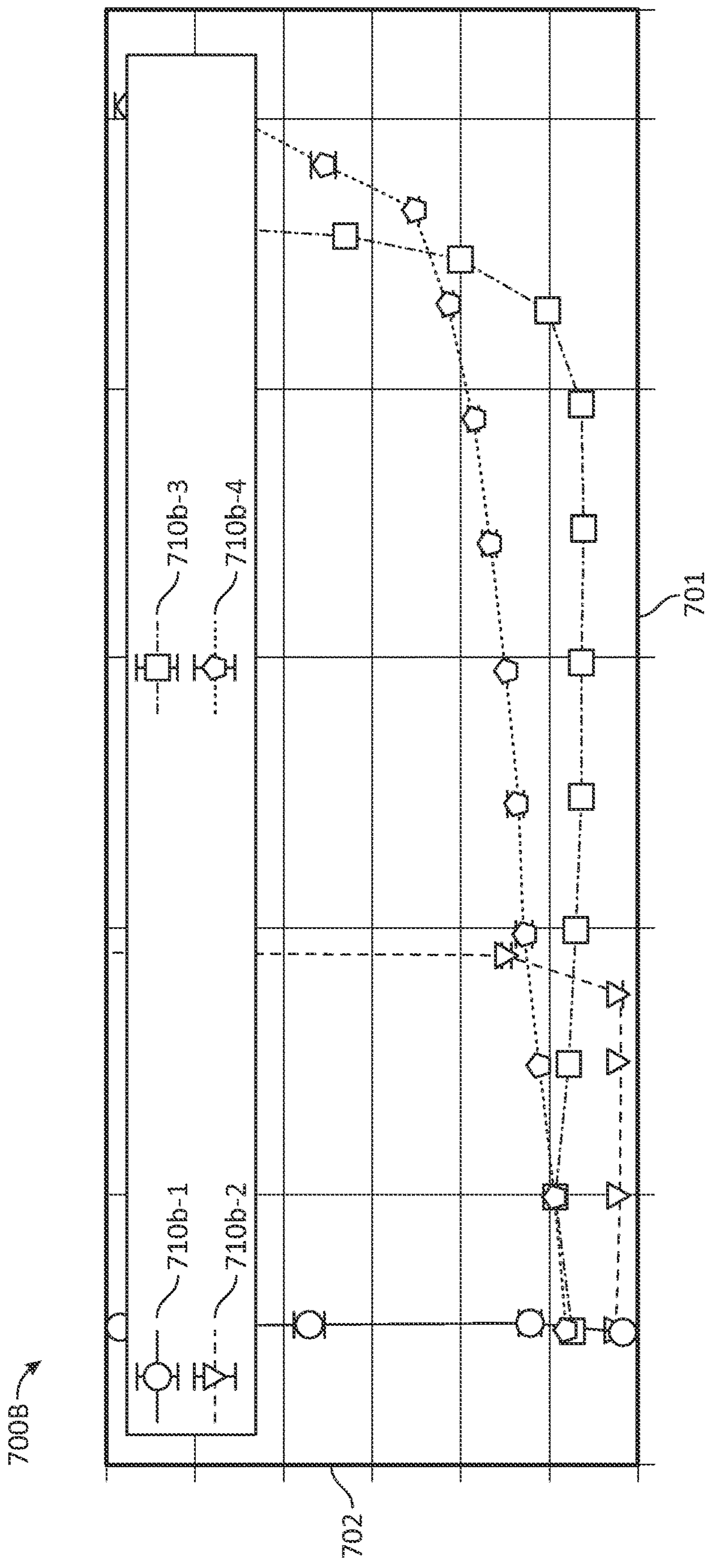
Figure 7C:
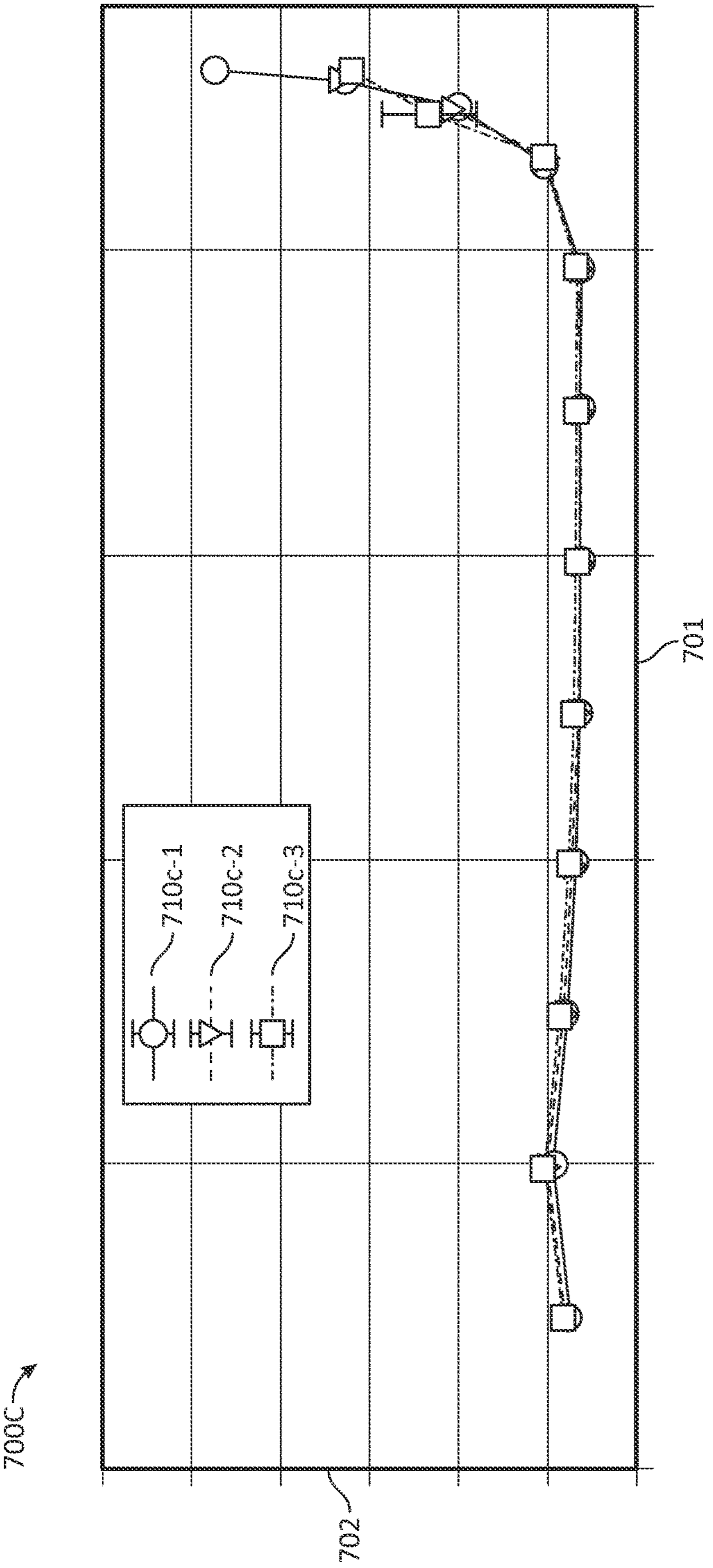

FIGS. 7A-7C illustrate throughput-latency charts 700A, 700B, and 700C (hereinafter, collectively referred to as "charts 700") for different verifiable directory architectures in a group chat application, according to some embodiments. Charts 700 indicate throughput 701 (abscissae, e.g., updates per second, arbitrary scale) and latency 702 (ordinates, e.g., seconds, arbitrary scale) of tree architectures for a verifiable directory as disclosed herein (cf. diagram 600, and verifiable directory 254). Accordingly, data structures as disclosed herein achieve enough throughput to operate at a world-wide scale. In addition, low latency is obtained even under high network load, and with large community sizes. The database runs efficiently on inexpensive machines with low specifications, and is robust when some parts of the system inevitably crash-fail. Charts 700 correspond to five different regions: N. Virginia (us-east-1), N. California (us-west-1), Sydney (ap-southeast-2), Stockholm (eu-north-1), and Tokyo (ap-northeast-1). The witnesses are evenly distributed across those regions. Each machine provides up to 5 Gbps of bandwidth, 2 virtual computation processing units (CPUs), with 1 physical core each, on a 2.5 GHz, 4 GB memory.

Chart 700A illustrates curves 710*a*-1, 710*a*-2, and 710*a*-3 (hereinafter, collectively referred to as "curves 710*a*") for varying numbers of witnesses. The maximum throughput 701 is around 800 updates/s (chart 710*a*-1) while keeping latency 702 below 3.5 seconds. In some configurations, an update rate around 250 updates/s may be sufficient. Chart 700A also illustrates that performance does not vary with 10 (curve 710*a*-1), 20 (curve 710*a*-2), or even 50 (curve 710*a*-3) witnesses. Increasing the number of geo-distributed witnesses up to 50 doesn't impact the end-to-end performance of the system. Increasing the number of witnesses may eventually make the network to become the system bottleneck.

Chart 700B illustrates curves 710*b*-1, 710*b*-2, 710*b*-3, and 710*b*-4 (hereinafter, collectively referred to as "curves 710*b*") when varying the batch size from $2^5$ (710*b*-1), to $2^7$ (710*b*-2), to $2^{10}$ (710*b*-3), to $2^{15}$ (710*b*-4) for 10 witnesses. The maximum throughput observed for batches sizes of $2^5$ (710*b*-1) and $2^7$ (710*b*-2) is respectively 100 updates/s and 350 updates/s. This is much lower than the 800 updates/s that can be achieved when configured with a batch size over $2^{10}$ (710*b*-3). Small batch sizes allow the database to trade throughput for latency. A database configured with a batch size of $2^5$ can process up to 100 updates/s in less than 800 ms, and setting the batch size to $2^7$ allows the database to operate at a massive scale while robustly maintaining sub-second latency.

Chart 700C illustrates curves 710*c*-1, 710*c*-2, and 710*c*-3 (hereinafter, collectively referred to as "curves 710*c*") when a committee of 10 witnesses suffers 1 (710*c*-1), 2 (710*c*-2), and 3 (710*c*-3) crash-faults (the maximum that can be tolerated in some embodiments). Accordingly, the database performance is not affected by crash-faults.

Figure 8:
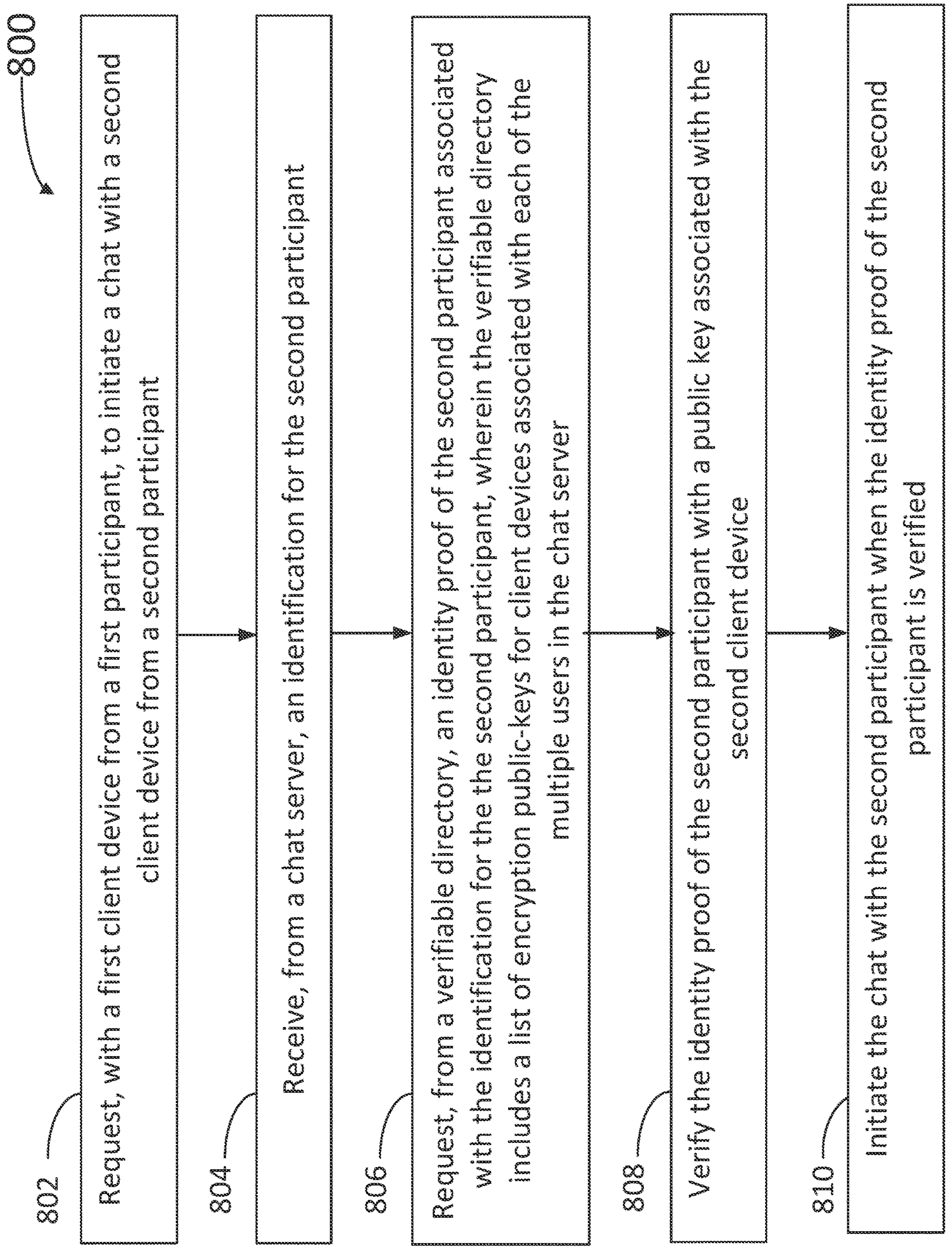
FIG. 8 is a flow chart illustrating steps in a method for using a verifiable key directory in a group chat, according to some embodiments.

FIG. 8 is a flow chart illustrating steps in a method 800 for using a verifiable key directory in a group chat, according to some embodiments. In some embodiments, a processor executing instructions stored in a memory may cause a computer in a client device, a server or database, communicatively coupled through a network via communications modules (cf. client devices 110, servers 130, database 152, network 150, processors 212, memories 220, and communications modules 218), to perform at least one or more of the steps in method 800, as disclosed herein. The memory may include a group chat application hosted by a chat engine, and a verifiable directory created by a tree tool in a storage engine as disclosed herein (cf. application 222, chat engine 232, verifiable directory 254, storage engine 234, and tree tool 242). The verifiable directory may be created using an encryption tool and provide identification proofs by accessing a verifiable random tool or a zero-knowledge tool in a verification engine, as disclosed herein (cf. encryption tool 244, verifiable random tool 246, and zero-knowledge tool 248 in verification engine 236). In some embodiments, methods consistent with the present disclosure may include at least one or more of the steps in method 800 performed in a different order, simultaneously, quasi-simultaneously, or overlapping in time.

Step 802 includes requesting, with a first client device from a first participant, to initiate a chat with a second client device from a second participant.

Step 804 includes receiving, from a chat server, an identification for the second participant.

Step 806 includes requesting, from a verifiable directory, an identity proof of the second participant associated with the identification for the second participant, wherein the verifiable directory includes a list of encryption public-keys for client devices associated with each of multiple users in the chat server. In some embodiments, step 806 includes requesting an updated identity proof for the second participant when the identity proof is not decoded by the private key.

Step 808 includes verifying the identity proof of the second participant with a public key associated with the second client device. In some embodiments, step 808 includes identifying a source of an identity attack from at least one of the second participant and the chat server. In some embodiments, step 808 includes requesting, to the verifiable directory, to update an identity for the first participant or the second participant. In some embodiments, step 808 includes matching, in the first client device, an output of a verifiable random function with the public key associated with the second client device as an input, with the identity proof. In some embodiments, the identity proof is a graphic code and step 808 includes scanning the graphic code with the first client device.

Step 810 includes initiating the chat with the second participant when the identity proof of the second participant is verified. In some embodiments, step 810 includes terminating the chat when the identity proof is not decoded by the public key associated with the second client device.

Figure 9:
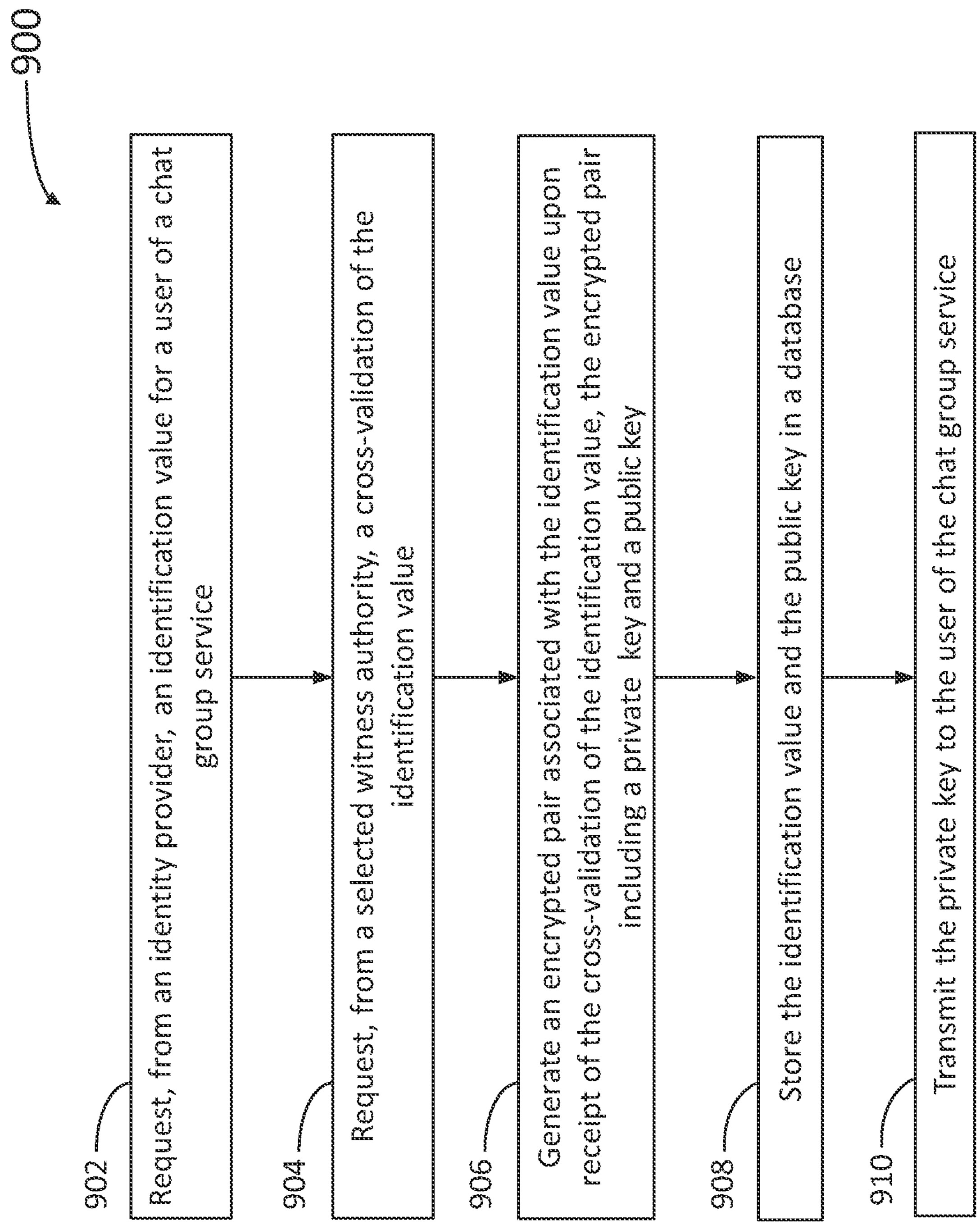
FIG. 9 is a flow chart illustrating steps in a method for creating a verifiable key directory in a group chat service, according to some embodiments.

FIG. 9 is a flow chart illustrating steps in a method 900 for creating a verifiable key directory in a group chat service, according to some embodiments. In some embodiments, a processor executing instructions stored in a memory may cause a computer in a client device, a server or database, communicatively coupled through a network via communications modules (cf. client devices 110, servers 130, database 152, network 150, processors 212, memories 220, and communications modules 218), to perform at least one or more of the steps in method 900, as disclosed herein. The memory may include a group chat application hosted by a chat engine, and a verifiable directory created by a tree tool in a storage engine as disclosed herein (cf. application 222, chat engine 232, verifiable directory 254, storage engine 234, and tree tool 242). The verifiable directory may be created using an encryption tool and provide identification proofs by accessing a verifiable random tool or a zero-knowledge tool in a verification engine, as disclosed herein (cf. encryption tool 244, verifiable random tool 246, and zero-knowledge tool 248 in verification engine 236). In some embodiments, methods consistent with the present disclosure may include at least one or more of the steps in method 900 performed in a different order, simultaneously, quasi-simultaneously, or overlapping in time.

Step 902 includes requesting, from an identity provider, an identification value for a user of a chat group service. In some embodiments, step 902 includes receiving, from the user of the chat group service, a request to verify the identification value.

Step 904 includes requesting, from a selected witness authority, a cross-validation of the identification value.

Step 906 includes generating an encrypted pair associated with the identification value upon receipt of the cross-validation of the identification value, the encrypted pair including a private key and a public key.

Step 908 includes storing the identification value and the public key in a database.

Step 910 includes transmitting the private key to the user of the chat group service. In some embodiments, step 910 includes receiving, from a participant in a group chat supported by the chat group service, a request for an identity proof of the user of the chat group service, and transmitting the private key to the participant in the group chat supported by the chat group service. In some embodiments, step 910 includes receiving, from the user of the chat group service, a request to modify the identification value into a new identification value, requesting, from the selected witness authority, a cross-validation of the new identification value, generating a new encrypted pair upon receipt of the cross-validation of the new identification value, the new encrypted pair including a new public key and a new private key, and updating the database to the new identification value associated with the new public key. In some embodiments, step 910 includes generating a new encrypted pair after a pre-selected period of time, the new encrypted pair including a new public key and a new private key, and updating the database to include the identification value associated with the new public key. In some embodiments, step 910 includes marking the identification value and the public key for deletion in the database; and deleting the identification value and the public key after a pre-selected period of time.

Hardware Overview

Figure 10:
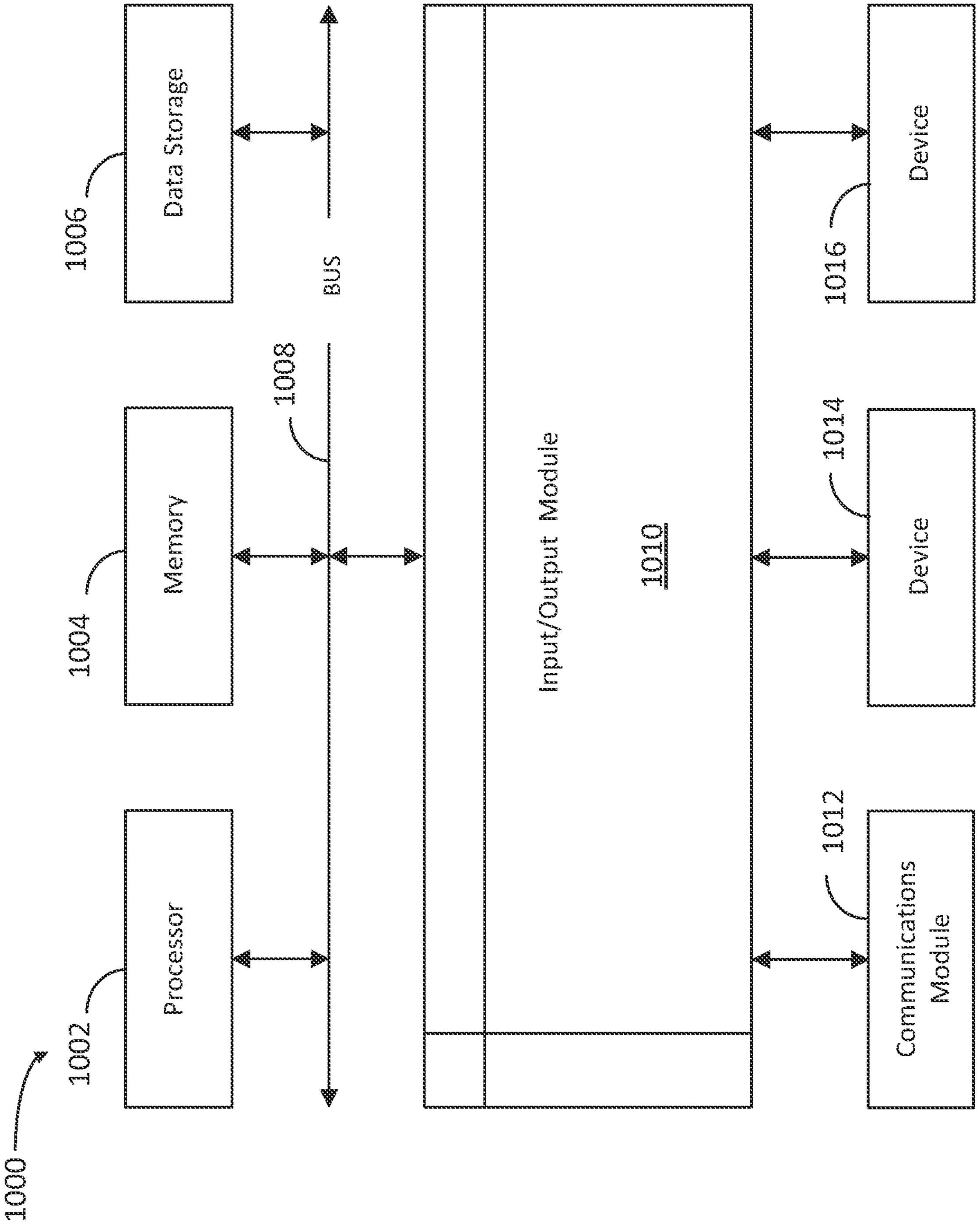
FIG. 10 is a block diagram illustrating an exemplary computer system with which headsets and other client devices, and the methods in FIGS. 8-9, can be implemented.

FIG. 10 is a block diagram illustrating an exemplary computer system 1000 with which headsets and other client devices 110, and method 800 and 900 can be implemented, according to some embodiments. In certain aspects, computer system 1000 may be implemented using hardware or a combination of software and hardware, either in a dedicated server, or integrated into another entity, or distributed across multiple entities. Computer system 1000 may include a desktop computer, a laptop computer, a tablet, a phablet, a smartphone, a feature phone, a server computer, or otherwise. A server computer may be located remotely in a data center or be stored locally.

Computer system 1000 includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled with bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, input/output module 1010 is configured to connect to a plurality of devices, such as an input device 1014 and/or an output device 1016. Exemplary input devices 1014 include a keyboard and a pointing device, e.g., a mouse or a trackball, by which a consumer can provide input to the computer system 1000. Other kinds of input devices 1014 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1016 include display devices, such as an LCD (liquid crystal display) monitor, for displaying information to the consumer.

According to one aspect of the present disclosure, headsets and client devices 110 can be implemented, at least partially, using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:

requesting, with a first client device from a first participant, to initiate a chat with a second client device from a second participant;

receiving, from a chat server, an identification for the second participant;

requesting, from a verifiable directory, an identity proof of the second participant associated with the identification for the second participant, wherein the identity proof of the second participant provides cryptographic proof of a record maintained by the verifiable directory for the second participant, and wherein the verifiable directory includes a Merkle tree storing encryption public-keys for client devices associated with each of multiple users in the chat server;

verifying, using a private key associated with the first client device and a public key associated with the second client device, that neither the public key associated with the second client device nor the identity proof have been modified by a third-party; and initiating the chat with the second participant after the identity proof of the second participant is verified.

2. The computer-implemented method of claim 1, further comprising identifying a source of an identity attack from at least one of the second participant and the chat server.

3. The computer-implemented method of claim 1, further comprising requesting, to the verifiable directory, to update an identity for the first participant.

4. The computer-implemented method of claim 1, further comprising:

matching, in the first client device, an output of a verifiable random function with the public key associated with the second client device as an input, with the identity proof.

5. The computer-implemented method of claim 1, wherein the identity proof is a graphic code and verifying the identity proof comprises scanning the graphic code with the first client device.

6. The computer-implemented method of claim 1, further comprising terminating the chat when the identity proof is not decoded by the public key associated with the second client device.

7. A system, comprising:

memory storing multiple instructions; and one or more processors configured to execute the instructions to cause the system to:

request, with a first client device from a first participant, to initiate a chat with a second client device from a second participant;

receive, from a chat server, an identification for the second participant;

request, from a verifiable directory, an identity proof of the second participant associated with the identification for the second participant, wherein the identity proof of the second participant provides cryptographic proof of a record maintained by the verifiable directory for the second participant, and wherein the verifiable directory includes a Merkle tree storing encryption public-keys for client devices associated with each of multiple users in the chat server;

verify, using a private key associated with the first client device and a public key associated with the second client device, that neither the public key associated with the second client device nor the identity proof have been modified by a third-party; and initiate the chat with the second participant after the identity proof of the second participant is verified.

8. The system of claim 7, wherein the one or more processors further execute instructions to identify a source of an identity attack from at least one of the second participant and the chat server.

9. The system of claim 7, wherein the one or more processors further execute instructions to request, to the verifiable directory, to update an identity for the first participant.

10. The system of claim 7, wherein the one or more processors further execute instructions to request an updated identity proof for the second participant when the identity proof is not decoded by the public key associated with the second client device.

11. The system of claim 7, wherein to verify the identity proof the one or more processors execute instructions to match, in the first client device, an output of a verifiable random function with the public key associated with the second client device as an input, with the identity proof.

12. The system of claim 7, wherein the identity proof is a graphic code and to verify the identity proof the one or more processors execute instructions to scan the graphic code with the first client device.

13. The system of claim 7, wherein the one or more processors further execute instructions to terminate the chat when the identity proof is not decoded by the public key associated with the second client device.

* * * * *